United States Patent

Barth et al.

[11] Patent Number: 5,445,442
[45] Date of Patent: Aug. 29, 1995

[54] DRIVE-SLIP CONTROL SYSTEM

[75] Inventors: Günter Barth, Korntal; Rolf Maier, Kernen, both of Germany

[73] Assignee: Robert Bosch GmbH, Stuttgart, Germany

[21] Appl. No.: 334,694

[22] Filed: Nov. 4, 1994

Related U.S. Application Data

[63] Continuation of Ser. No. 38,915, Mar. 29, 1993, abandoned.

[30] Foreign Application Priority Data

Sep. 29, 1990 [DE] Germany ............... 40 30 881

[51] Int. Cl.⁶ .................... B60K 28/16; B60T 8/32
[52] U.S. Cl. ............................. 303/141; 303/169
[58] Field of Search ............ 303/100, 103, 106, 110, 303/111; 180/197; 364/426.01, 426.02, 426.03

[56] References Cited

U.S. PATENT DOCUMENTS

| | | | |
|---|---|---|---|
| 4,679,866 | 7/1987 | van Zanten et al. | 303/104 |
| 4,950,037 | 8/1990 | Kopper et al. | 303/110 |
| 5,058,699 | 10/1991 | Fennel et al. | 180/197 |
| 5,135,290 | 8/1992 | Cao et al. | 303/100 |
| 5,188,434 | 2/1993 | Ruf et al. | 303/111 |

FOREIGN PATENT DOCUMENTS

| | | |
|---|---|---|
| 3809100 | 9/1989 | Germany . |
| 3814957 | 11/1989 | Germany . |
| 4030724 | 4/1992 | Germany . |
| 61-257332 | 11/1986 | Japan . |
| 9108935 | 6/1991 | WIPO . |
| 9205986 | 4/1992 | WIPO . |

OTHER PUBLICATIONS

Oppelt, Kleines Handbuch technischer Regelvorgänge, pp. 65, 67, Date unknown.

Primary Examiner—Josie A. Ballato
Attorney, Agent, or Firm—Felfe & Lynch

[57] ABSTRACT

The invention relates to a drive slip control system in which the driven wheels are braked when spinning. Desired braking torques for the driven wheels are calculated using the actual speeds of the driven wheels and the desired speeds of the driven wheels. A first controller generates a first braking torque value MB1 using the difference $\omega_D$ in the actual speeds and the difference $\omega^*_D$ in the desired speeds. A second controller generates a second braking torque value MB2 using the sum $\omega_S$ of the actual speeds and the sum $\omega^*_S$ of the desired speeds. Both controllers have an integral component and a proportional component. The desired left braking torque $MB_L$ is calculated using the sum $MB1+MB2$. The desired right braking torque $MB_R$ is calculated using the difference $MB2-MB1$. The desired torques are then converted to control times for the brake pressure control valves.

10 Claims, 3 Drawing Sheets

DRIVE-SLIP CONTROL SYSTEM

This application is a continuation of application Ser. No. 08/038,915, filed Mar. 29, 1993, now abandoned.

BACKGROUND OF THE INVENTION

The invention relates to a drive slip control system for a vehicle with a rigid drive train, wherein the wheel speeds can be described by means of the following differential equations $$\omega_L = V1(MB_L - MS_L) - V2(MB_R - MS_R) + V3(MM)$$

$$\omega_R = V2(MB_L - MS_L) + V1(MB_R - MS_R) + V3(MM)$$

wherein
- V1, V2 and V3 are constants dependent on the gear engaged (drive ratio), where $V1 < V2$.
- $MB_L$, $MB_R$ = braking torque left, right
- $MS_L$, $MS_R$ = road torque caused by slip curve left, right
- MM = engine torque
- $\omega_L$, $\omega_R$ = wheel speeds left, right (rad/sec).

The two control quantities $\omega_L$ and $\omega_P$ are intercoupled here via V2.

SUMMARY OF THE INVENTION

The principle of angular momentum for a rigid drive train with differential having two degrees of freedom expressed as the driven wheel sum $(\omega_R + \omega_L) = \omega_S$ and the driven wheel speed difference $(\omega_R - \omega_L) = \omega_D$ applies, and the following is obtained:

$$(Jm + 2Jr)\omega_S = MS_L + MS_R - (MB_L + MB_R) + MM$$
$$(2Jr)\omega_D = MS_L - MS_R - (MB_L - MB_R)$$

It can be seen that there is no longer any intercoupling here; the control actions $(MB_L + MB_R)$ and $(MB_L - MBR)$ which are independent of one another are obtained.

Jm and Jr are the moments of inertia of the engine and of the wheel respectively.

However, since the drive train is not rigid, the elasticities of the drive train also should be taken into account, and this is taken into consideration by means of an imaginary equivalent elasticity between the engine and wheels.

This results in the three controllers which work in parallel and independently of one another and of which the first controller processes the speed difference, the second controller processes the speed sum, and the third controller processes the engine speed in the control quantity. The first and the second are PI controllers since both have an integral component in addition to the proportional component, while a proportional behavior is sufficient for the third controller. The controllers transmit signals which correspond to the wheel torques MB and which take the form of braking torques.

The control behavior of the first controller can be described as follows:

$$MB1 = I_1 + KP_1](\omega^*_R - \omega_L^*) - (\omega_R - \omega_L)]$$

where $\omega^*_R$ and $\omega^*_L$ are desired speeds, and $KP_1$ is a constant. More simply, $MB1 = I_1 + KP_1(\omega^*_D - \omega_D)$ $I_1$ is the integral component which is, in turn, also dependent on $\omega_D$, and can be represented as follows:

$$I_1$$

In this, fi represents a loss term which does not normally take effect, that is to say fi = 1, but when slippage of both driven wheels falls below a low threshold, it can tend towards 0. $KP_1 (\omega^*_D - \omega_D)$ is the proportional component of MB1.

The control behavior of the second controller can be described as follows:

$MB2 = I_2 + KP_2\omega_2 +$ engine controller coupling torque, in which $$\omega_2 = (\omega^*_R + \omega^*_L) - (\omega_R + \omega_L) \text{ or}$$

$$\omega_2 = \omega^*_S - \omega_S$$

$$I_2 = I_{2n} = \sum_{i=1}^{n} K_{12}.$$

Different desired speeds $\omega^*_L$ and $\omega^*_R$ (or desired slips $\lambda^*_L$ and $\lambda^*_R$) affect MB2 in its magnitude and MS1, if appropriate, in its sign. $KP_2 \omega_2$ is the proportional component of MB2.

The engine-controller coupling torque is obtained from the desired braking torque of the brake controllers which is filtered first, and then passes through a PI element with stationary desired brake torque $MB_{min}$ as a desired value and, at the output, a further filter with a dead-time element (37 in FIG. 3). The transition from two regulating quantities to one regulating quantity takes place in a non-linear way described below (FIG. 3 in block 35).

The control behavior of the third controller (damping controller) is described as follows:

$MB3 = KP_3\omega_3$, in which $\omega_3 = \omega_M/ig - \omega_2$; $\omega_M$ is the engine speed, by the overall gear transmission ratio, and $KP_3$ the control amplifier. The third controller processes the engine speed in order to damp the fluctuations between engine speed and wheel speeds which result from the elasticity of the drive train.

The invention is applicable especially where an overriding controller, taking into account the vehicle dynamics, predetermines different and changing desired slips and therefore desired speeds. Such an overriding controller is disclosed in FIG. 2 of U.S. Pat. No. 5,188,434, which is incorporated herein by reference.

In the solution according to the invention, the overriding ASR concept can be exchanged more easily (easier adaptation). That is, the controllers downstream of the ASR, which calculates the slip values and the desired values of the wheel speed, are not influenced by an adaptation or exchange of the ASR.

DETAILED DESCRIPTION OF THE PREFERRED EMBODIMENT

Figure 1:
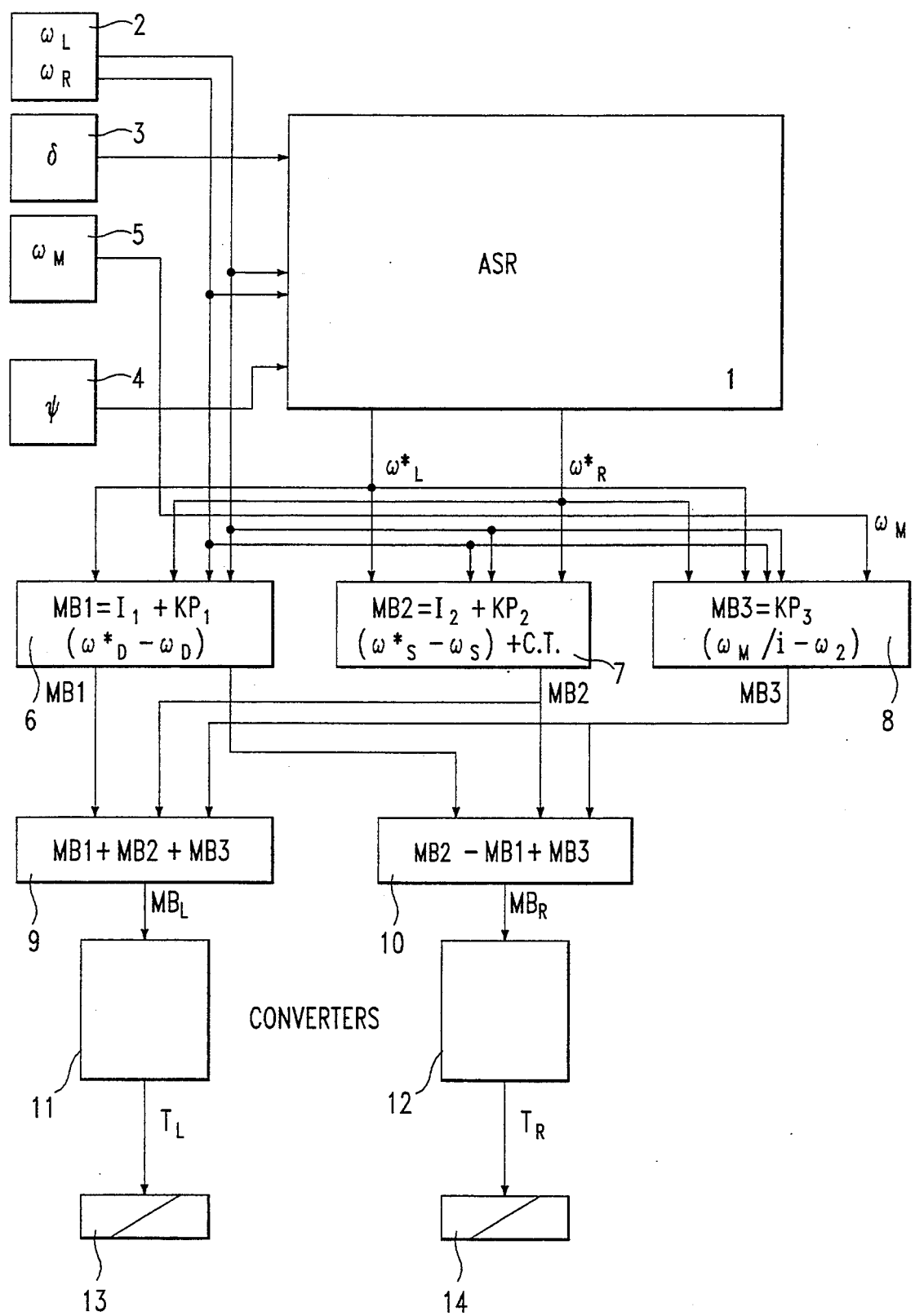
FIG. 1 is a diagram of the system according to the invention.

The invention is explained in more detail by means of the exemplary embodiment of FIG. 1 of the drawing. There, 1 denotes an ASR, to which, for example, the wheel speeds $\omega_L$ and $\omega_R$, or generically $\omega_i$ of the driven wheels, the steering angle $\delta$ and the yawing speed $\rho$ are fed from sensors 2, 3 and 4. The only important thing here about this controller 1, is that, from the sensor signals supplied, it transmits desired brake-slip values $\lambda^*_i$ or desired speeds $\omega^*_i$ for the driven wheels which, in addition to reducing the drive slip, are intended to bring about a stabilization of the vehicle. The desired speeds $\omega^*_i$ can be calculated in a known way from the desired braking-slip values $\lambda^*_i$.

The wheel speeds $\omega_L$ and $\omega_R$ are also fed to first controller 6, second controller 7 and third controller 8. The desired speeds $\omega^*_i$ are also fed to the controllers 6, 7 and 8, and the engine speed derived from a sensor 5 is fed to the controller 8. The controller 6 generates, at its outputs, signals corresponding to torques+MB1 and −MB1, and the controllers 7 and 8 each generate, at both outputs, signals corresponding to respective identical torques MB2 and MB3.

These signals are added in blocks 9 and 10 for the two sides of the vehicle. The signals obtained correspond to the braking torque $MB_L$ and $MB_R$ to be applied to the wheels. Blocks 11 and 12 convert these signals into control times TL and TR for valves 13 and 14. For this purpose, the brake pressure also has to be calculated. The procedure is described in more detail in German Patent Application 40 30 724, which corresponds to Wo 92/05986.

The first controller 6 of FIG. 1, which controls by means of the difference $\omega_D = \omega_R - \omega_L$ functions, for example, as a synchronizing controller, that is to say it equalizes the wheel speeds with one another, and thus ensures an electronic barrier between the driven wheels. In the event of a change from μ-split, in which situation the barrier effect is required, to a high μ on both sides, in which situation a barrier effect is no longer needed, the one-sided brake action is still maintained for some time on account of the integral component in the controller, and the unpleasant effects of this make themselves felt to the driver.

In this case, therefore, the abovementioned loss term fi, which reduces the barrier effect, is activated. Preferably, the reduction is dependent on the amount of slip or, even better, on the gradient of the slip curve during this slip. As a result of this loss term, the integrator becomes a delay element of the first order.

The loss term fi is effective only when the two driving wheels fall below the magnitude of a low slip threshold $\lambda_K$.

Figure 2:
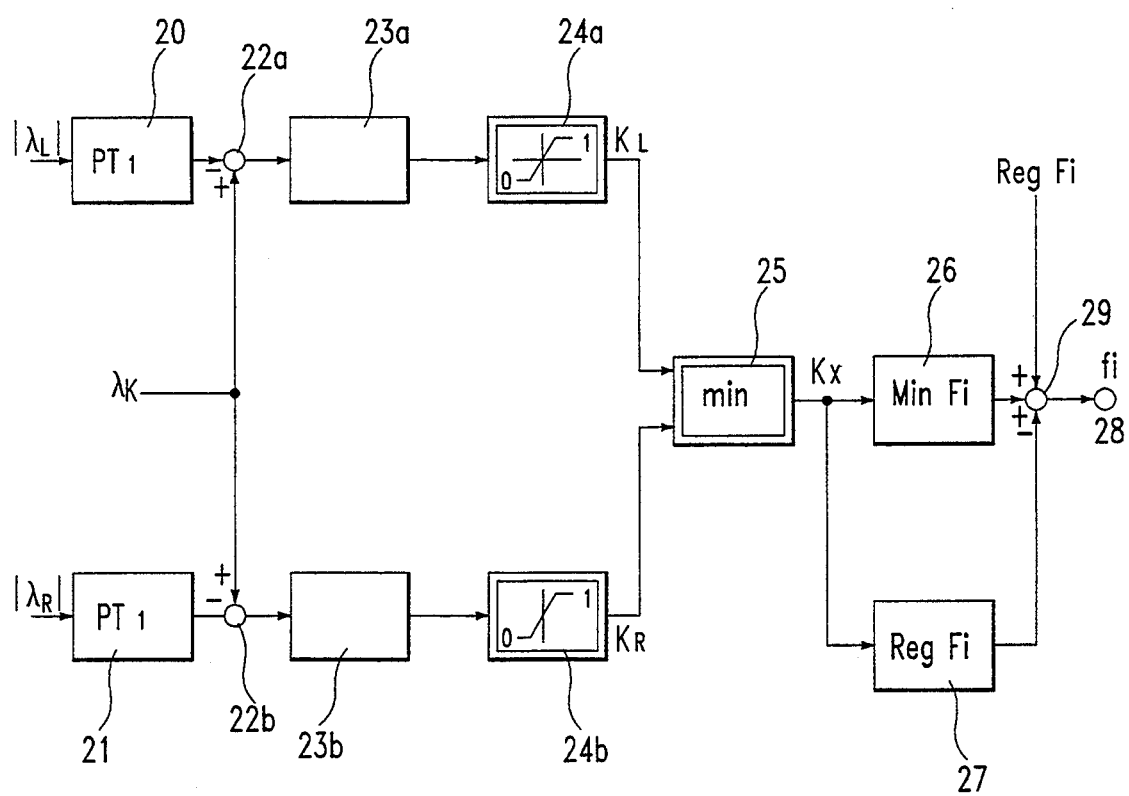
FIG. 2 is a diagram of a subsystem for generating a loss term fi.

A block diagram of this is shown in FIG. 2. There, the slip values $\lambda_L$ and $\lambda_R$ for the two driven wheels are fed via filters 20 and 21, which minimizes errors in the slip model, to subtracting points 22a, 22b which form the difference of a slip threshold $\lambda_K$ with the slip values $\lambda_L$ and $\lambda_R$. A standardization is carried out by multiplication by $1/\lambda_K$ in blocks 23a and 23b, and the numbers obtained are limited to values $K_L$ and $K_R$ between 0 and 1 in filters 24a and 24b. Of the two values, the smaller is selected in 25 as Kx and multiplied by MinFi in 26 and RegFi in 27. At the summing point 29, the result of 26 is added to RegFi and the result of 27 is subtracted from it. The loss term fi is obtained as a result.

The abovementioned coupling by means of the slip curve is at its greatest at $\lambda_L = 0$ and $\lambda_R = 0$.

The overall controller shown hitherto generates only one regulating quantity for each side of the vehicle, which can be used for brake-pressure control.

According to a development of the invention, the braking torques $MB_L$ and $MB_R$ determined can now be divided by means of a filter into a slow fraction and a fast fraction and only the fast fraction used for controlling the braking torque. The slow fraction is used for engine control.

Figure 3:
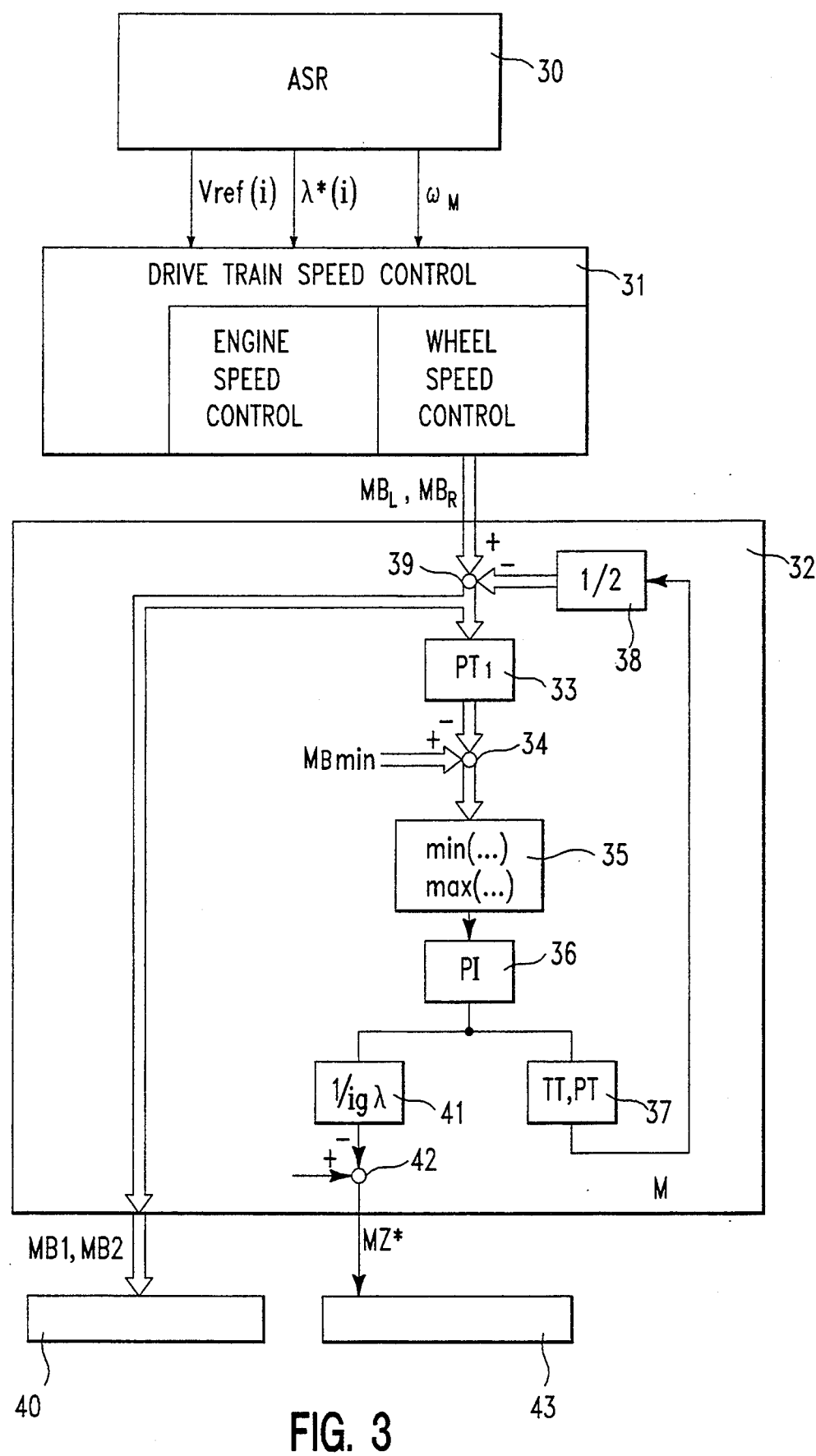
FIG. 3 is a diagram of a preferred embodiment wherein the desired engine torque is calculated from the braking torque.

This is explained in more detail by means of FIG. 3. Here, a block 30 corresponds to the block 1 plus the sensors 2–4 and the block 31 corresponds to the blocks 6 to 10. Desired braking torques $MB_L$ and $MB_R$ are output as sums of torques. For each side, a low-pass filter 33 transmits only the slow fraction which is compared in a difference former 34 with a minimum torque $MB_{min}$.

A signal corresponding to the difference is transmitted whenever the amount of the filtered fraction is greater than the minimum torque $MB_{min}$. The following block 35 selects the higher or lower value of the two values supplied, according to the external control. A select hi function is obtained when the braking torque of the wheel braked to the lesser extent is admitted as the greatest input torque into the PI element 36, which is a controller having both proportional and integral components.

Select lo has as input torque the torque of the wheel braked to the greater extent. A particular advantage of the algorithm shown in FIG. 3 is that not only strategies, such as select lo or select hi, can be operated, but also a specific right/left differential torque can be set in a controlled manner as a limit value (predetermined, for example, by an overriding controller).

For this purpose, starting from the select hi setting, the lower braking torque is used as input torque of the PI element 36, until the permissible amount between the lowest and highest braking torque minus the permissible amount of differential torque is used as the input torque. When the differential torque approaches zero, the select lo function is obtained. It can be seen that, depending on the size of the permissible differential torque, a continuous adjustment from select lo to select hi is possible in a simple way. The control is carried out by the overriding controller 30 which, for example from the steering angle, vehicle speed and accelerator pedal-position, calculates desired values, for example for the yawing speed, and, in comparison with the yawing speed derived, for example, from the wheel signals, calculates desired torques or desired slip values on the wheels.

The summing point 34 denotes a desired value/actual-value comparison of the desired braking torque MB min with the stationary (filtered) braking torque. The PI element 36 is intended for setting the braking torque to this value. After a low pass and dead-time element 37, the calculated braking torque M is divided in equal parts at torque distribution block 38 and at the summing point 39 the parts are subtracted from the braking torques $MB_L$ and $MB_R$ first calculated.

The braking torque obtained after block 36 is converted, after division by the overall gear ratio ig at 41, which includes the transmission ratio and the differential ratio, into an equivalent engine torque, by which the current engine torque is reduced at 42.

The result is the desired engine torque MM* which is to be converted by means of an engine control and which the block 43 sets via a family of characteristics.

The dynamics of the control are determined by the filter 33 at the input. The slow feedback caused by the block 37 is intended to ensure that faults remain small and that the brake controller is uncoupled from engine action.

The effect of the errors in the dynamic engine model are kept small by the PT1 command—quantity filter (flow pass filter 33) at the input. Conversely, this means that the more accurately the engine and brakes are modelled, the quicker the coupling can take place.

The above-explained principle of torque allocation to the engine and brake can also be applied to torque controllers designed differently from that described above.

We claim:

1. Drive slip control system for a motor vehicle having right and left driven wheels which exhibit respective wheel speeds $\omega_R$ and $\omega_L$, and an engine exhibiting an engine speed $\omega_m$, said system comprising
    means for determining driven wheel speeds $\omega_R$ and $\omega_L$,
    means for determining desired driven wheel speeds $\omega^*_L$ and $\omega^*_R$,
    a first controller which determines a braking torque value MB1 which depends on $\omega_D$ and $\omega^*_{D1}$ where $\omega^*_D = \omega^*_R - \omega^*_L$, and $\omega_D = \omega_R - \omega_L$,
    a second controller which determines a braking torque value MB2 which depends on $\omega_s$ and $\omega^*_S$, where $\omega^*_S = \omega^*_R + \omega^*_L$, and $\omega_S = \omega_R + \omega_L$,
    means for forming a desired left braking torque $MB_L$ by forming the sum MB1+MB2,
    means for forming a desired right braking torque $MB_R$ by forming the difference MB2−MB1,
    means for converting the desired braking torques $MB_L$ and $MB_R$ to respective control times $T_L$ and $T_R$, and
    left and right brake pressure control valves which permit build-up of brake pressure at left and right driven wheels for respective control times $T_L$ and $T_R$, in order to obtain the desired braking torques $MB_L$ and $MB_R$.

2. Drive slip control system as in claim 1 further comprising
    means for determining the engine speed $\omega_M$,
    a third controller which determines a braking torque value MB3 which depends on the engine speed $\omega_M$,
    said left braking torque $MB_L$ being formed according to $MB_L = MB2 + MB2 + MB3$,
    said right braking torque $MB_R$ being formed according to $MB_R = MB2 - MB1 + MB3$.

3. Drive slip control system as in claim 2 wherein MB3 is determined according to
    $MB3 = KP_3 \, \omega_M / ig$
    where $KP_3$ is a constant, ig is the overall gear ratio, and $\omega_2 = \omega^*_S - \omega_S$.

4. Drive slip control system as in claim 1 further comprising filter means which divide each braking torque $MB_L$ and $MB_R$ into a fast fraction and a slow fraction, only said fast fraction being used to generate said control times $T_L$ and $T_R$.

5. Drive slip control system as in claim 4 further comprising means using said slow fraction to control engine torque.

6. Drive slip control system as in claim 1 wherein MB1 is determined according to $MB1 = I_1 + KP_1(\omega^*_D - \omega_D)$ where $I_1$ is an integral component and $KP_1$ is a constant.

7. Drive slip control system as in claim 6 further comprising
    means for determining a slip $\lambda_L$ for the left driven wheel and a slip $\lambda_R$ for the right driven wheel,
    means for comparing said slips $\lambda_L$ and $\lambda_R$ to a threshold $\lambda_K$, and
    means for reducing said integral component $I_l$ when said slips $\lambda_L$ and $\lambda_R$ are both less than said threshold $\lambda_K$.

8. Drive slip control system as in claim 1 wherein MB2 is determined according to
    $MB2 = I_2 + KP_2(\omega^*_S - \omega S) +$ engine controller coupling torque where $I_2$ is an integral component and $KP_2$ is a constant.

9. Drive slip control system as in claim 1 wherein said means for determining desired driven wheel speeds $\omega^*_L$ and $\omega^*_R$ comprises an ASR.

10. Method for controlling drive slip in a motor vehicle having right and left driven wheels which exhibit respective wheel speeds $\omega_R$ and $\omega_L$, and an engine exhibiting an engine speed $\omega_m$, said method comprising
    determining driven wheel speeds $\omega_R$ and $\omega_L$,
    determining desired driven wheel speeds $\omega^*_L$ and $\omega^*_R$,
    determining a braking torque value MB1 which depends on $\omega_D$ and $\omega^*_D$, where $\omega^*_D = \omega^*_R - \omega^*_L$ and $\omega_D = \omega_R - \omega_L$,
    determining a braking torque value MB2 which depends on $\omega_S$ and $\omega^*_S$ where $\omega^*_S = \omega^*_R + \omega^*_L$, and $\omega_S = \omega R + \omega_L$,
    forming a desired left braking torque $MB_L$ by forming the sum MB1+MB2,
    forming a desired right braking torque $MB_R$ by forming the difference MB2−MB1,
    converting the desired braking torques $MB_L$ and $MB_R$ to control times $T_L$ and $T_R$, and
    building up brake pressure at left and right driven wheels for respective control times $T_L$ and $T_R$, in order to obtain the desired braking torques $MB_L$ and $MB_R$.

* * * * *

UNITED STATES PATENT AND TRADEMARK OFFICE
CERTIFICATE OF CORRECTION

PATENT NO : 5,445,442
DATED : August 29, 1995
INVENTOR(S): Barth et al.

It is certified that error appears in the above-identified patent and that said Letters Patent is hereby corrected as shown below:

In Column 2, line 1 of the Patent, after "$I_1$" add -- $= I_{1n} = \sum_{i=1}^{n} (-fi)_i K_{1i} \omega_{Di} \Delta i$ --

In Column 2, line 16 of the Patent, change "$K_{12}$" to -- $K_{12} \omega_{2i} \Delta i$ --

In Claim 2, line 40 of the Patent, change the first occurrence of "MB2" to -- MB1 --.

In Claim 3, line 45 of the Patent, "$\omega_x/ig$" should read -- $(\omega_x/ig - \omega_2)$ --.

In Claim 10, line 39 of the Patent, change "$\omega R$" to -- $\omega_R$ --.

Signed and Sealed this

Sixteenth Day of June, 1998

BRUCE LEHMAN

*Attest:*

*Attesting Officer*          *Commissioner of Patents and Trademarks*